United States Patent [19]

Lubin

[11] Patent Number: 5,260,791
[45] Date of Patent: Nov. 9, 1993

[54] METHOD AND APPARATUS FOR THE SPATIO-TEMPORAL CORING OF IMAGES

[75] Inventor: Jeffrey Lubin, Plainsboro Township, Middlesex County, N.J.

[73] Assignee: David Sarnoff Research Center, Inc., Princeton, N.J.

[21] Appl. No.: 894,382

[22] Filed: Jun. 4, 1992

[51] Int. Cl.$^5$ .............................................. H04N 5/00
[52] U.S. Cl. .................................. 358/160; 358/166; 358/167
[58] Field of Search .................. 358/166, 167, 36, 37, 358/160, 162; 382/56

[56] References Cited

U.S. PATENT DOCUMENTS

| 5,050,230 | 9/1991 | Jones et al. | 358/166 X |
| 5,119,195 | 6/1992 | Christopher | 358/167 |
| 5,130,798 | 7/1992 | Christopher | 358/167 X |

FOREIGN PATENT DOCUMENTS

9111963.6  4/1991  United Kingdom .

OTHER PUBLICATIONS

W. A. Lee, "Coring on oriented band-pass images," Senior Independent Project, Dept. of Elec. Eng., Princeton Univ., Jan. 12, 1988.

J. M. Ogden and E. H. Adelson, "Computer simulations of oriented multiple frequency band coring," unpublished RCA Corp. Technical Report, 1985.

R. O. Lloyd, K. D. Baker, and G. D. Sullivan, "Image transform modelled on visual processing mechanisms of the brain," IEE Int. Conf. on Electronic Image Processing, Conf. Pub. 214, pp. 31-37, 1982.

P. J. Burt and W. A. Lee, "A family of pyramid structures for multiresolution image processing," unpublished manuscript, Nov. 12, 1988.

P. J. Burt, "A method for constructing gradient and second derivative pyramids," RCA Corp. Internal Correspondence, Feb. 24, 1986.

B. E. Bayer and P. G. Powell, "A method for the digital enhancement of unsharp, grainy photographic images," Advances in Computer Vision and Image Processing, pp. 31-88, 1986.

P. G. Powell and B. E. Bayer, "A method for the digital enhancement of unsharp, grainy photographic images," IEE Int. Conf. on Electronic Image Processing, Conf. Pub. 214, pp. 179-183, 1982.

*Primary Examiner*—Mark R. Powell
*Attorney, Agent, or Firm*—William J. Burke

[57] ABSTRACT

A spatio-temporally oriented coring method and apparatus for reducing noise in a sequence of images is disclosed. The method comprises the steps of decomposing each image into low-pass and a prefiltered sub-images, decomposing each prefiltered sub-image into a plurality of component patterns which are oriented in space, time or a combination of space and time, filtering each oriented component pattern to form a plurality of filtered patterns and reconstructing the image from the filtered patterns and the low-pass sub-image. Apparatus for reducing the noise in a sequence of images comprises means for decomposing each image into low-pass and prefiltered sub-images, means for decomposing each prefiltered sub-image into a plurality of component patterns which are oriented in space, time or a combination of space and time, means for filtering each component pattern to form a plurality of filtered patterns, and means for reconstructing the image from the filtered patterns and the low-pass sub-image.

17 Claims, 11 Drawing Sheets d1 d2 d3 d4 d5 d6 d7 d8 d9

METHOD AND APPARATUS FOR THE SPATIO-TEMPORAL CORING OF IMAGES

The invention relates to a method and apparatus for reducing the noise in a sequence of images using spatial and temporal image coring techniques.

BACKGROUND OF THE INVENTION

Coring is a non-linear filtering technique traditionally used by television engineers to reduce the perceptibility of noise in the luminance signal. Traditional one dimensional (1-D) coring process is effective under the condition that the prefilter is well matched to the signal, and poorly matched to the noise. This condition is often violated in typical image sequences. As a result, a 1-D coring process has never worked well in practice. A signal decomposition better matched to relevant signal features such as coring methods based on a 2-D spatial decomposition of an image into multiple oriented and frequency bands produces better quality in the processed image. These work better than a 1-D coring process because important signal features tend to be spatially oriented, while typical noise is spatially isotropic. The noise is therefore broadly distributed with low amplitude over a number of oriented channels, while each signal feature tends to show up with higher amplitude in only one or a few channels. In previous coring processes, the shape of the coring function is fixed and is the same for every filter at every point in space.

While these techniques have proven useful for still images, they have not produced similar results for sequences of images which vary in time.

SUMMARY OF THE INVENTION

The invention is a spatio-temporally oriented coring method for reducing the noise in a sequence of images comprising the steps of decomposing each image into low frequency band pass and a prefiltered sub-images, decomposing each prefiltered sub-image into a plurality of component patterns which are oriented in space, time or a combination of space and time, subjecting each component pattern to a coring filter to form a plurality of filtered patterns, and reconstructing the image from the filtered patterns and the low frequency band pass sub-image.

The invention is also apparatus for reducing the noise in a sequence of images comprising means for decomposing each image into low frequency band pass and a prefiltered sub-images, means for decomposing each prefiltered sub-image into a plurality of component patterns which are oriented in space, time or a combination of space and time, means for subjecting each component pattern to a coring filter to form a plurality of filtered patterns, and means for reconstructing the image from the filtered patterns and the low frequency band pass sub-image.

DETAILED DESCRIPTION

Figure 1:
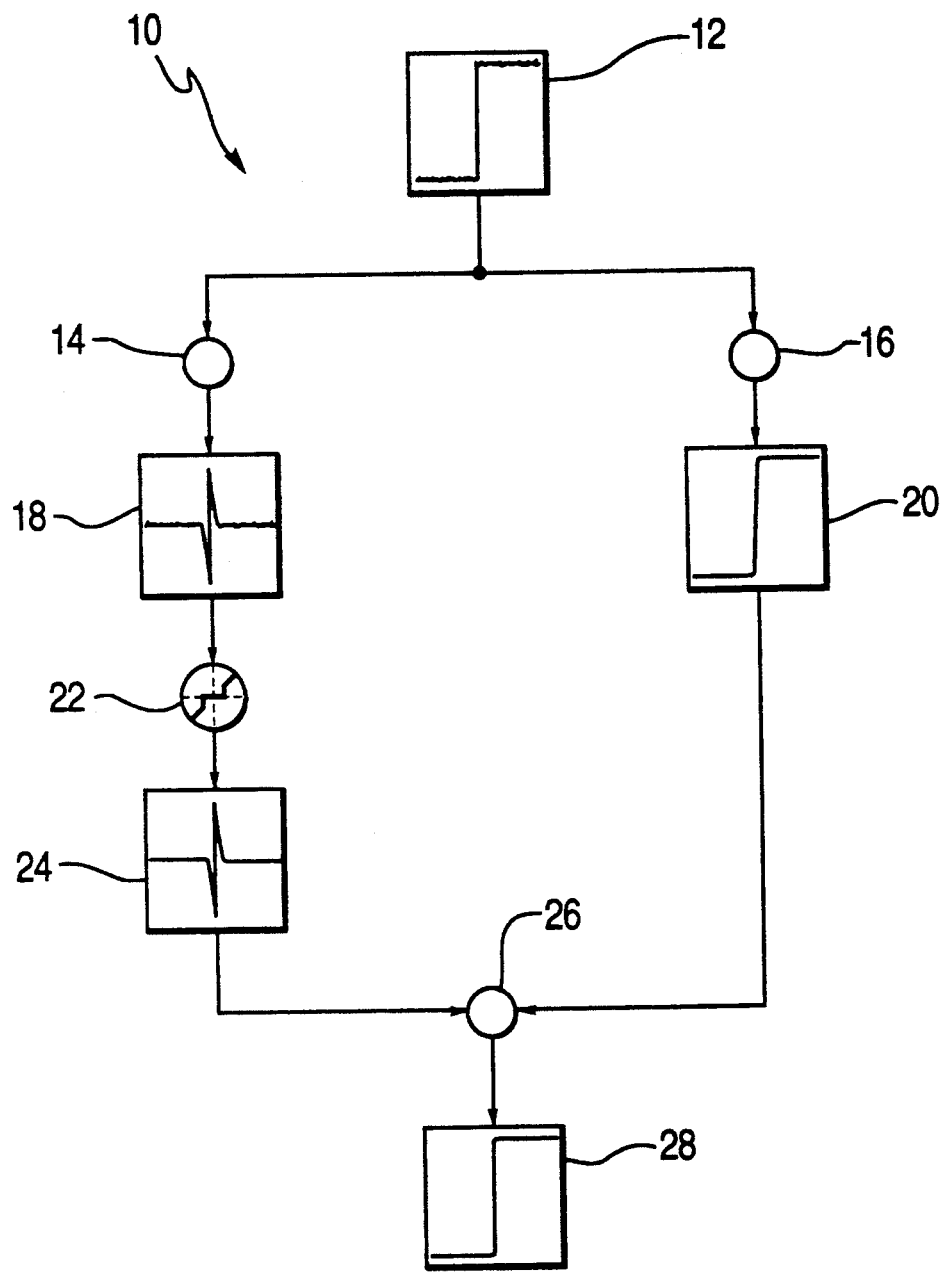
FIG. 1 is a schematic diagram of a prior art 1-D coring system.

In FIG. 1, a prior art one-dimensional coring system 10 is illustrated. A one-dimensional luminance signal 12 is fed to prefilter 14 and low-pass filter 16 to produce prefiltered and low-pass signal components 18 and 20, respectively. The prefiltered component 18 is then put through a coring filter 22 to produce the cored component 24. The coring filter 22 is a threshold non-linearity that sets signal values with an absolute value less than a predetermined value to zero values. The low-pass component 20 and the cored component 24 are then fed to adder 26 to construct an output signal which is a version of the input signal with reduced noise.

The invention is a spatio-temporally oriented coring process for reducing the noise in a sequence of moving images using an oriented three dimensional 3-D (two spatial dimensions in the plane of the image and time) decomposition of spatio-temporal signals. Signal structures tend to cohere over time as well as over space, while noise tends to be temporally as well as spatially uncorrelated so that a set of decomposition filters oriented in both time and space will tend to select signal features and distribute the noise better than a set oriented in space alone. It is understood that the sequence of images can comprise identical spatial images which differ only in time.

The invention also includes a method for adaptively setting the shape of the non-linear coring function at each point in time and space. The gain of each coring function is controlled by the responses of other filters at the same point in time and space. This adaptive coring function allows the coring threshold to adapt to the current level of the noise in the image sequence as opposed to prior art methods and systems which only have fixed thresholds.

Method and apparatus embodying the invention disclosed below can be implemented using a computer or hardware components. It is clear to one of ordinary skill in the art that the functions of pixel, line and frame delays, frame stores, subtractors, adders, multipliers and the like can be implemented in either way.

Figure 2A:
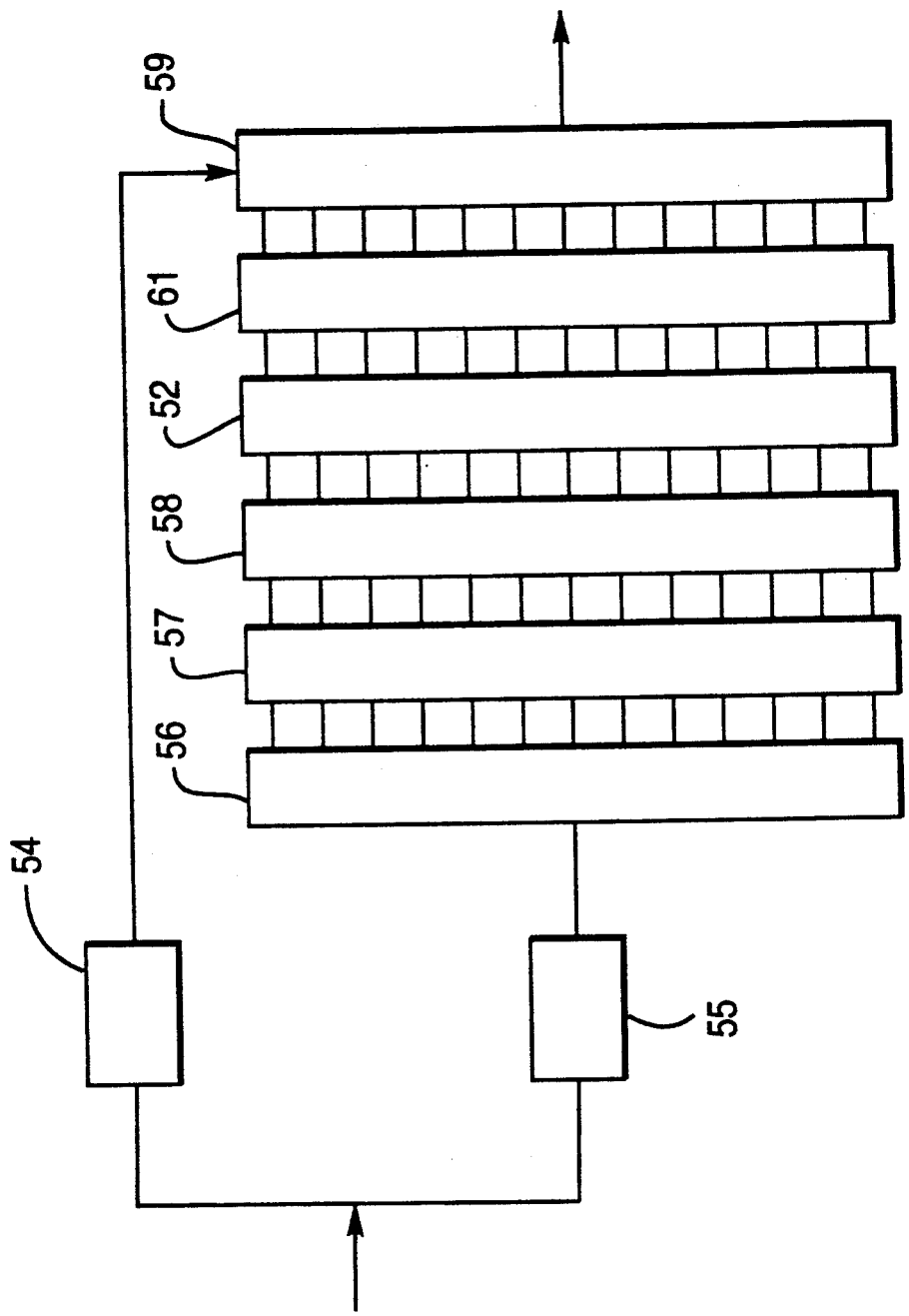
FIGS. 2(a) and 2(b) are schematic illustrations of an embodiment of a spatio-temporal coring system of the invention.
Figure 2B:
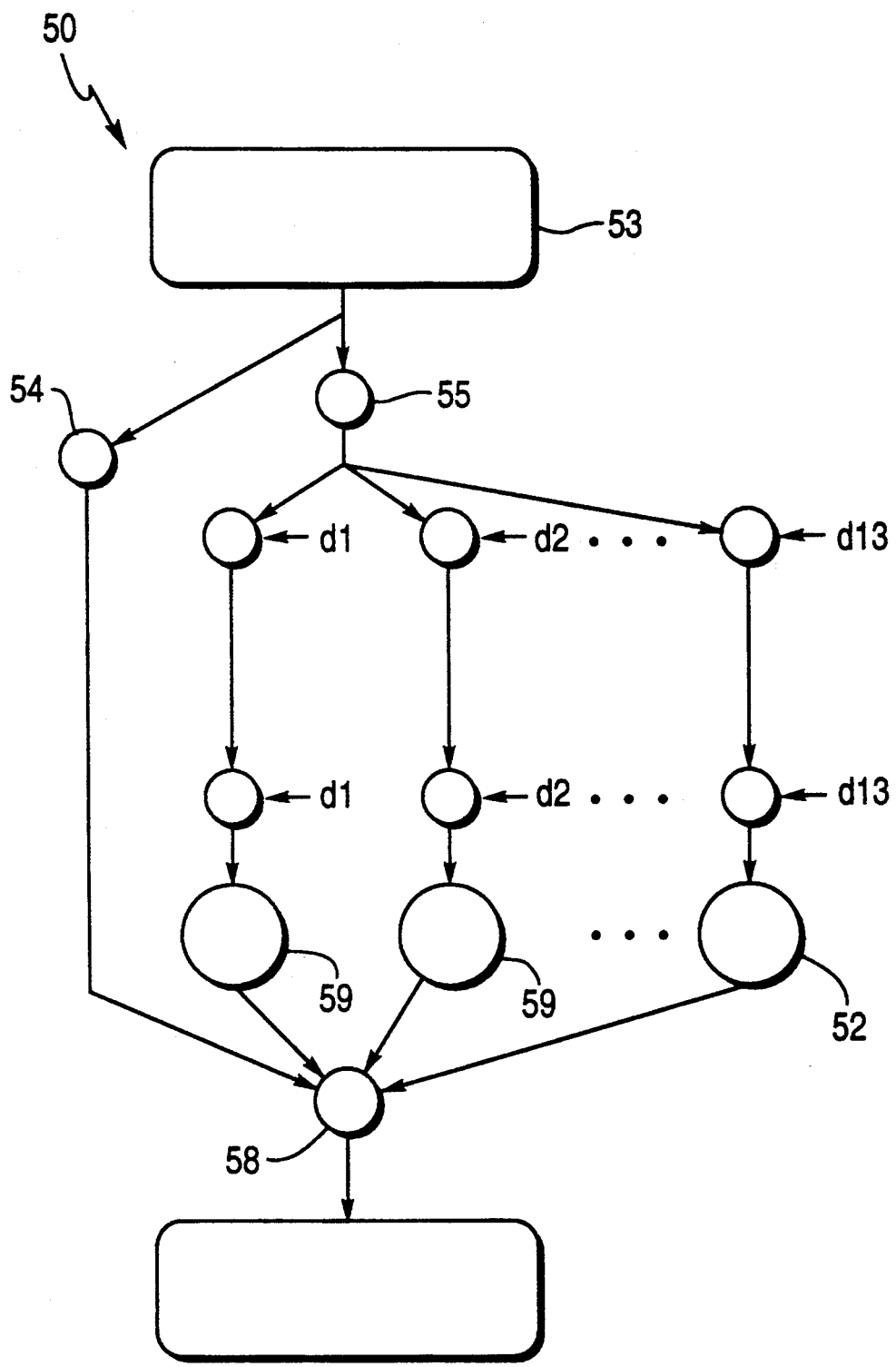
Figure 2C:
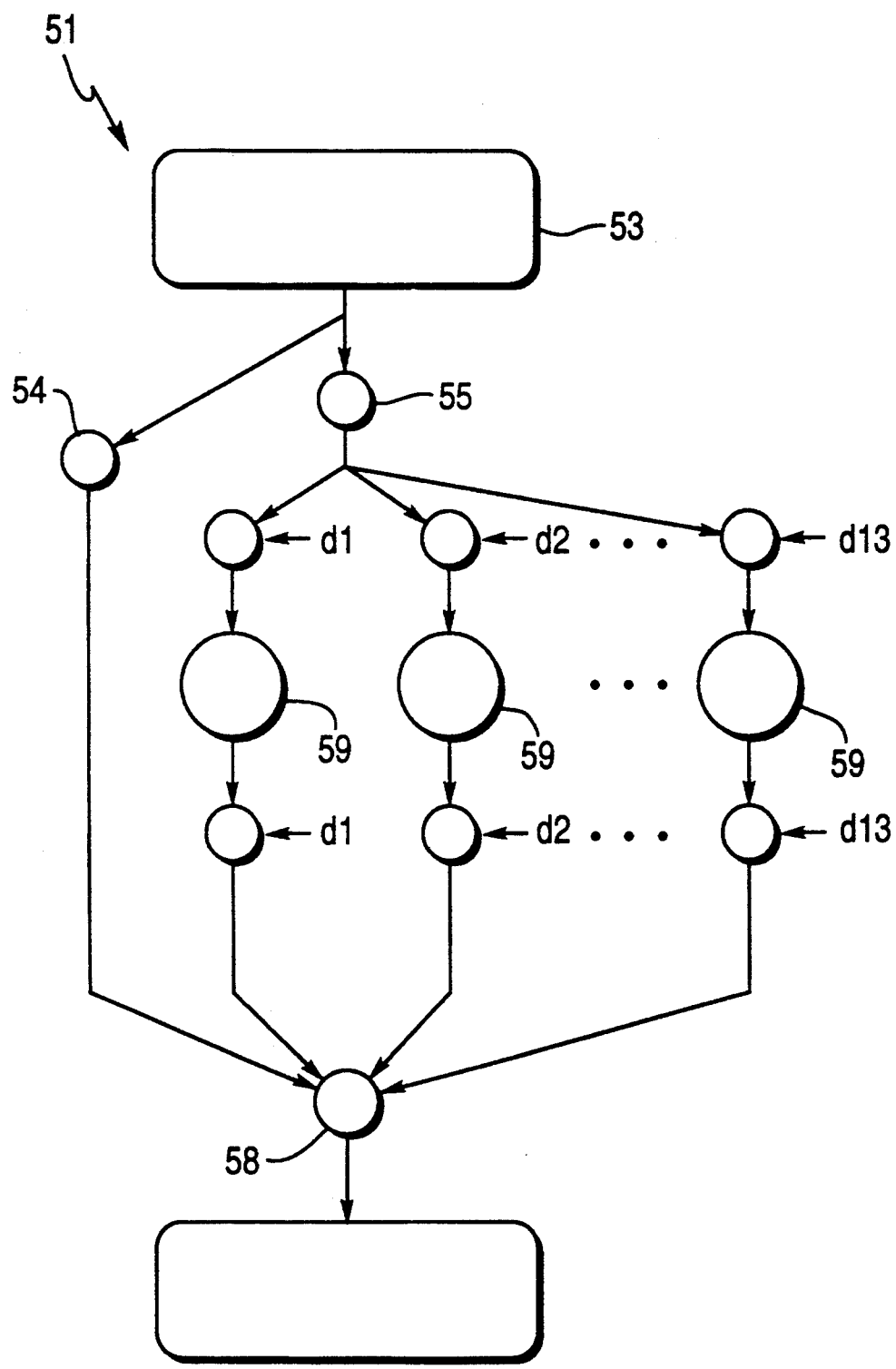
FIG. 2(c) is a schematic illustrations of second embodiment of a spatio-temporal coring system of the invention.

In FIGS. 2(a), 2(b) and 2(c) apparatus for 3-D spatiotemporal coring of a sequence of two or more images illustrates the three basic operations, linear filtering, coring and adding, of the method of the invention. In FIGS. 2(a), 2(b) and 2(c) and 3 through 7 the common elements are numbered the same. The figures differ in that in FIGS. 2(a) and 2(b) the linear filters are applied twice to the prefiltered signal prior to coring while in FIG. 2(c) coring is performed between the two linear filtering steps.

In FIG. 2(a) and 2(b) apparatus 50 includes input means 53 for supplying a sequence of two or more images. Input means 53 is connected to low-pass filter 54 and prefilter 55. The low-pass filter 54 is connected to adder 59. The output of prefilter 55 is connected in parallel to the inputs of thirteen oriented linear filters 56 labelled d1 through d13. The outputs of filters 59 are connected in series to the inputs of thirteen oriented linear filters 57, also labelled d1 through d13. The outputs of filters 57 are connected in series to the inputs of coring filter 58 which are, in turn connected in series to postfilters 52 and times −1/16 multipliers 61. Adder 59 combines the thirteen prefiltered components and the low-pass component to produce a reconstructed output sequence of signals having improved noise content.

In FIG. 2(c) the output of each of the oriented filters d1 through d13 is connected in series to coring filter 59. The output of the each of the coring filters 59 is connected to a second oriented linear filter, again labelled d1 through d13 respectively, identical to the oriented linear filter at the input to the particular coring filter. The output of the each of the second set of thirteen oriented linear filters is connected in series to the adder 58. In this embodiment care must be taken to spatially and temporally align the signal components in the output stream.

The oriented linear filter decomposition is a generalization of a 2-D oriented decomposition and is based on the 3-D generating kernel w, a separable 3×3×3 tap filter with taps proportional to [1 2 1] in each of the spatial dimensions X, Y and the time dimension T. That is, $$w = (1/64) \begin{vmatrix} 1 & 2 & 1 \\ 2 & 4 & 2 \\ 1 & 2 & 1 \end{vmatrix} \begin{vmatrix} 2 & 4 & 2 \\ 4 & 8 & 4 \\ 2 & 4 & 2 \end{vmatrix} \begin{vmatrix} 1 & 2 & 1 \\ 2 & 4 & 2 \\ 1 & 2 & 1 \end{vmatrix}$$

where the separate sets of brackets represent the different temporal frames, and the fraction 1/64 is an overall scaling factor.

Figure 3:
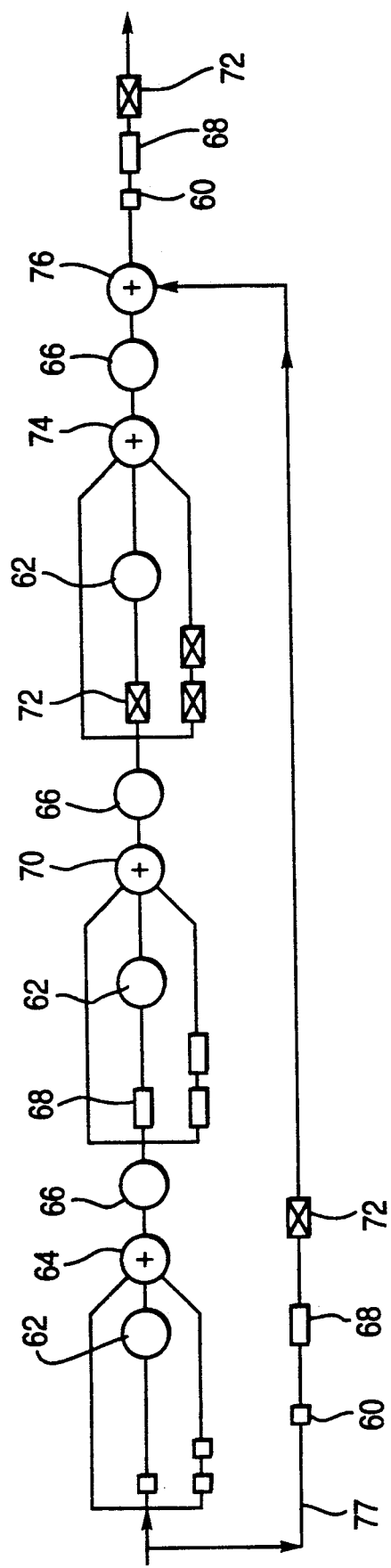
FIG. 3 is a block diagram of the prefilter of FIGS. 2.

The prefilter 55 can be expressed as P=(1+w), where 1 is the identity matrix. In FIG. 3 the prefilter 55 includes three stages. The first stage includes pixel delays 60, times 2 multiplier 62 and adder 64. The first stage sums the input, the input through a delay 60 and multiplier 62, and the input through two delays 60 at adder 64. The output passes through multiplier 66 (times one quarter) and into the second stage. The second stage sums its input, the input through a line delay 68 and a multiplier 62, and the input through two delays 68 at adder 70. The output passes through multiplier 66 (times one quarter) and into the second stage. The output passes through multiplier 66 (times one quarter) and into the third stage. The third stage sums its input, the input through a frame delay 72 and a multiplier 62, and the input through two delays 72 at adder 74. The output then passes through multiplier 66 (times one quarter) to adder 76. The identity matrix is added to the output w of the three stage filter via path 77 and adder 76. Pixel, line and frame delays 60, 68 and 72, respectively, are inserted in path 77 to equalize the delays. Pixel, line and frame delays 60, 68 and 72, respectively, are also preferably inserted in the output path of the prefilter 55.

Figure 4:
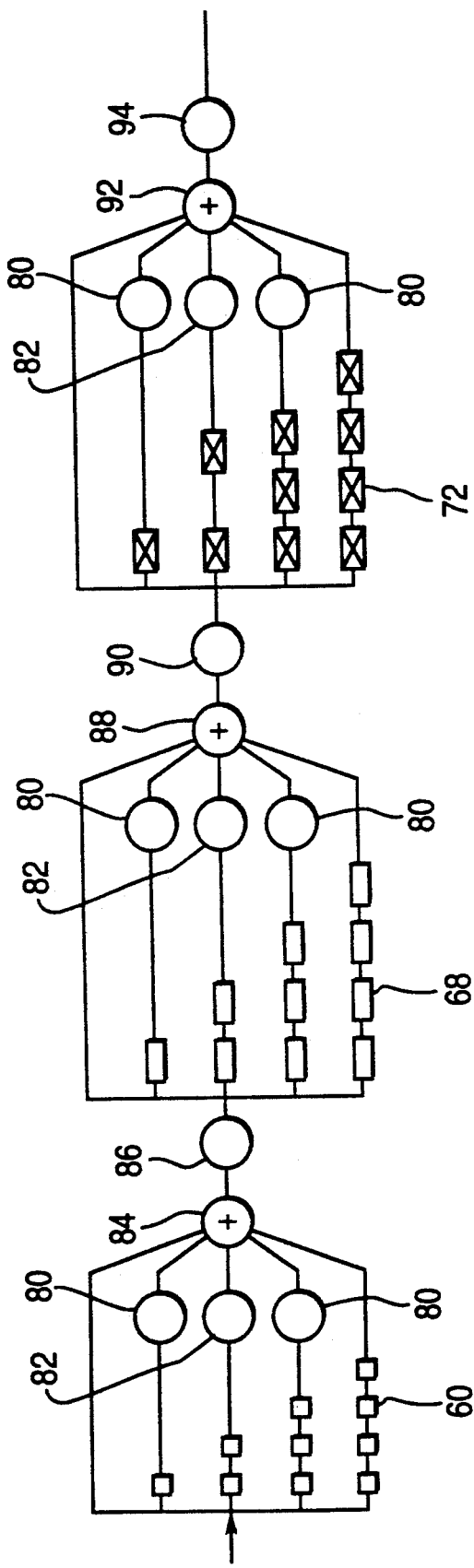
FIG. 4 is a block diagram of the low frequency band pass filter of FIG. 2.

The low-pass filter 54 can be expressed as Q=w*w, making filter 54 a 5×5×5 tap spatio-temporal low-pass filter with taps proportional to the fourth order binomial coefficients [1 4 6 4 1] in each of the dimensions X, Y, and T. In FIG. 4 the low-pass filter 54 includes three stages. The filter includes pixel delays 60, line delays 68, frame delays 72, times 4 multipliers 80 and times 6 multipliers 82. The first stage sums the input, the input through a delay 60 and multiplier 80, the input through two delays 60 and multiplier 82, and the input through three delays 60 and multiplier 82, the input through four delays 60 and the input through four delays 60 at adder 84. The output passes through multiplier 86 (times one sixteenth) and into the second stage. The second stage sums the input, the input through a line delay 68 and a multiplier 80, the input through two delays 68 and multiplier 82, the input through three delays 68 and multiplier 80, and the input through four delays 68 at adder 88. The output passes through multiplier 90 (times one sixteenth) and into the third stage. The third stage sums the input, the input through a frame delay 72 and a multiplier 80, the input through two delays 72 and multiplier 82, the input through three delays 72 and multiplier 80, and the input through four delays 72 at adder 92. The output then passes through multiplier 94 (times one sixteenth).

As shown in FIGS. 2(a) and (b), the 13 oriented linear filters are applied to the prefiltered signal twice, with a change in sign on the second application. Without coring, the result is a set of oriented Laplacian components with taps proportional to [1 −2 1]. These components have the property that when summed together, the result is a spatio-temporally isotropic Laplacian; i.e., the same response that would be obtained by application of the isotropic filter (1−w) to the input signal. So, given a sequence of input images $I_N$, the processing through the summation of oriented Laplacian components is the Laplacian $L_N$ of the prefiltered signal, which can be expressed as:

$$L_N = (1-w)*P*I_N$$

$$L_N = (1-w)*(1+w)*I_N$$

$$L_N = (1-w*w)*I_N$$

$$L_N = I_N - Q*I_N.$$

where P=(1+w) and Q=w*w as defined above. Adding Q*S to $L_S$ $$Q*I_N + L_N = I_N - Q*I_N + Q*I_N = I_N$$

showing that perfect reconstruction of the sequence of input images $I_N$ is obtained by adding the spatio-temporal low-pass signal $Q*I_N$ to the sum of the oriented Laplacian components $L_N$.

Oriented linear filters $d_1$ through $d_{13}$ are a set of two-tap directional derivatives. Of the 13 filters, the first three are the simple derivatives dX, dY, and dT:

$$d_1 = |-1 \ 1| \quad d_2 = \begin{vmatrix} 1 \\ -1 \end{vmatrix} \quad d_3 = |1||-1|$$

The next six are the pairs of face diagonals on the XY, XT and YT planes:

$$d_4 = (1/\sqrt{2}) \begin{vmatrix} 1 & 0 \\ 0 & -1 \end{vmatrix} \quad d_5 = (1/\sqrt{2}) \begin{vmatrix} 0 & 1 \\ -1 & 0 \end{vmatrix}$$

$$d_6 = (1/\sqrt{2})|1 \ 0||0 \ -1|$$

$$d_7 = (1/\sqrt{2})|0 \quad 1||-1 \quad 0|$$

$$d_8 = (1/\sqrt{2})\begin{vmatrix}1 & 0\\0 & -1\end{vmatrix} \quad d_9 = (1/\sqrt{2})\begin{vmatrix}0 & -1\\1 & 0\end{vmatrix}$$

The remaining four are the body diagonals:

$$d_{10} = (1/2)\begin{vmatrix}1 & 0\\0 & 0\end{vmatrix}\begin{vmatrix}0 & 0\\0 & -1\end{vmatrix}$$

$$d_{11} = (1/2)\begin{vmatrix}0 & 0\\1 & 0\end{vmatrix}\begin{vmatrix}0 & -1\\0 & 0\end{vmatrix}$$

$$d_{12} = (1/2)\begin{vmatrix}0 & 1\\0 & 0\end{vmatrix}\begin{vmatrix}0 & 0\\-1 & 0\end{vmatrix}$$

$$d_{13} = (1/2)\begin{vmatrix}0 & 0\\0 & 1\end{vmatrix}\begin{vmatrix}-1 & 0\\0 & 0\end{vmatrix}$$

The scaling factor of $(1/\sqrt{2})$ for filters $d_4$ through $d_9$ and $\frac{1}{2}$ for filters $d_{10}$ through $d_{13}$ are needed to take into account the diagonal pixel distances.

Figure 5:
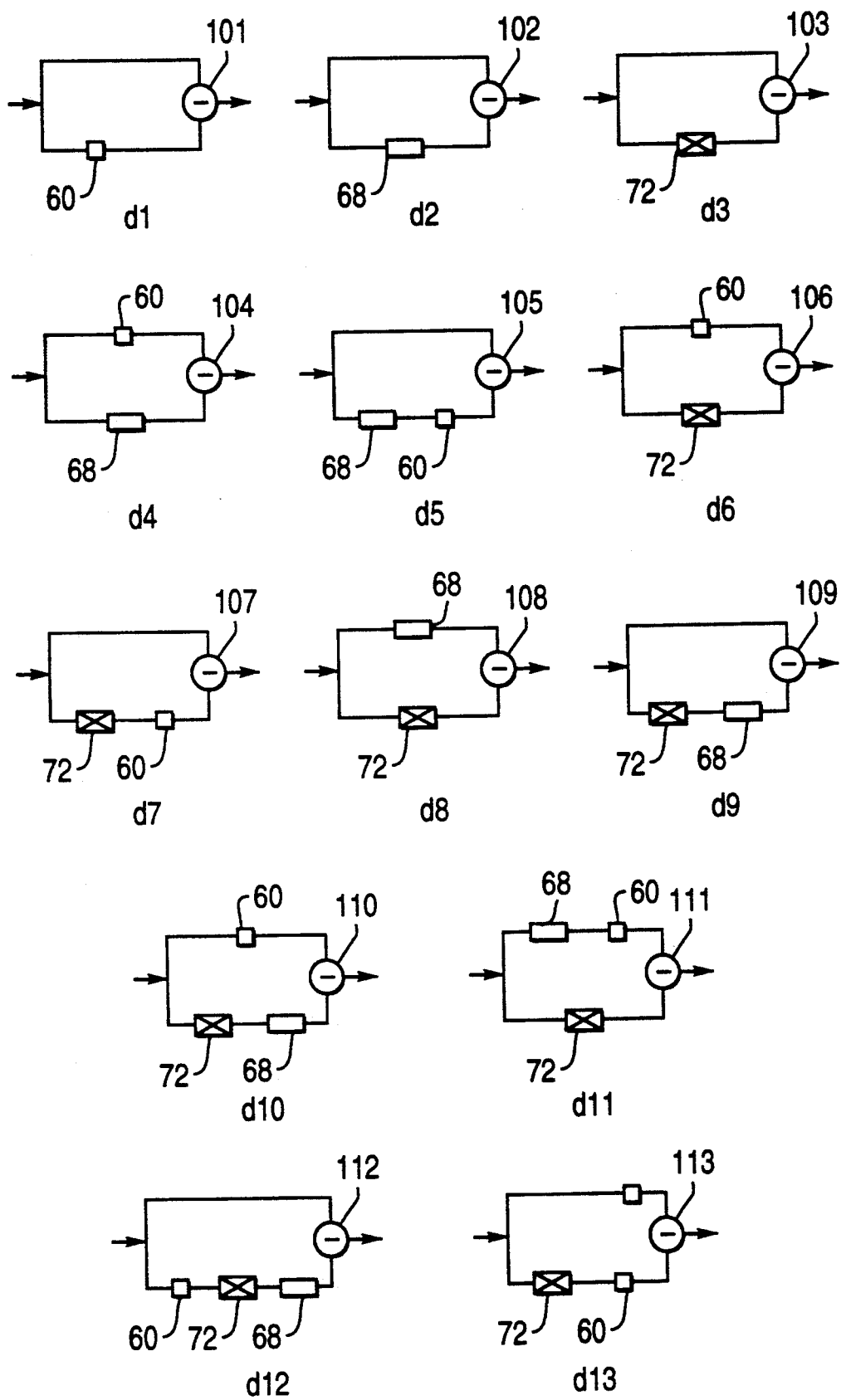
FIG. 5 is a block diagram of each of the thirteen oriented linear filters d1 through d13 of FIGS. 2(a) and 2(b).

In FIG. 5 the thirteen filters d1 through d13 include a subtractor 101 through 113, respectively, and some combination of a pixel delay 60, a full line delay 68 and a full frame delay 72. The input signal to filter d1 the is connected directly to an input of subtractor 101 and through a single pixel delay 60 to the second input of subtractor 101, producing an output d1 which is the first derivative of the prefiltered signal with respect to X. The input signal to filter d2 is connected directly to an input of subtractor 102 and through a line delay 68 to the second input of subtractor 102, producing an output d2 which is the first derivative of the prefiltered signal with respect t Y. The input signal to filter d3 is connected directly to an input of subtractor 103 and through a frame delay 72 to the second input of subtractor 103, producing an output d3 which is the first derivative of the prefiltered signal with respect to T.

Figure 6:
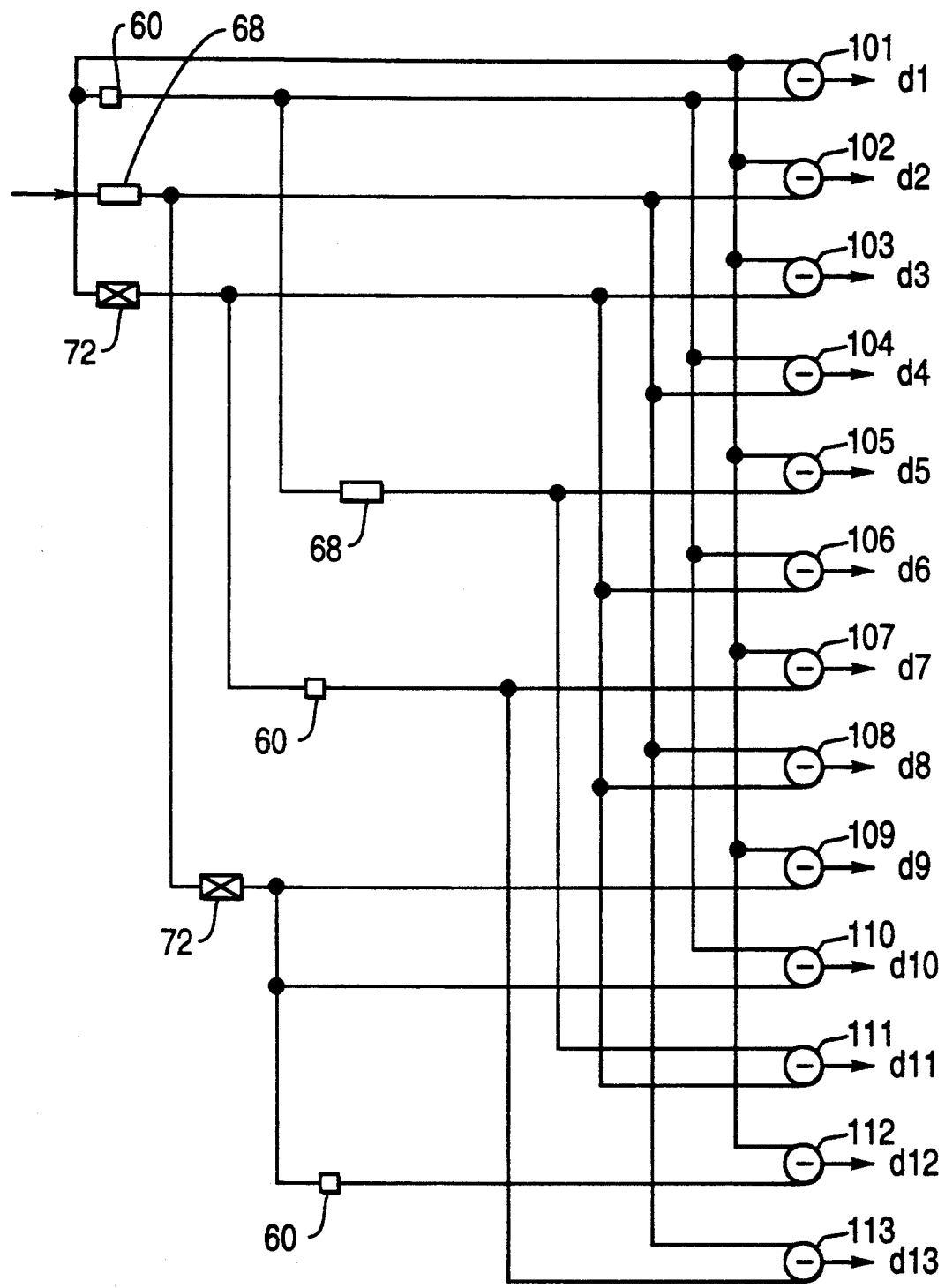
FIG. 6 is a block diagram of a circuit for the thirteen oriented linear filters of FIG. 5.

The combination of the circuits for the thirteen filters d1 through d13 into one circuit is shown in FIG. 6 in block form. Each of these filters and their combinations can be implemented using a commercial Field Programmable Gate Array circuit (FPGA) such as XC3042 manufactured by Xilinx, Inc., San Jose, Calif. 95124.

Figure 7:
FIG. 7 is a block diagram of a postfilter.
Figure 7:
Figure 7:
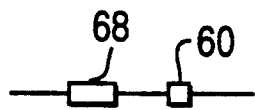
Figure 7:
Figure 7:
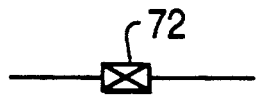
Figure 7:
Figure 7:
Figure 7:
Figure 7:

In FIG. 7, the postfilter 52 is shown in block form. The postfilter only has components for the signal paths for filters d1 through d9. Each filter consists of one or more of a pixel delay 60, a line delay 69 and/or a frame delay 72.

In FIGS. 2(a) and (b), coring may be performed after the first or second application of the oriented linear filters to the prefiltered signal or after both. Coring after the oriented second derivative responses have been added together would be equivalent to traditional isotropic coring.

In a spatial gradient system, coring is sometimes performed only on the first derivative responses because the second derivative response of an edge has a zero-crossing at the location of the edge. While coring on this response would tend to distort edge position information, coring on the first derivative response, which has a peak at the edge location, would not. Second, since the variance of a weighted average of independent random variates is proportional to the sum of the squares of the weights, a second derivative operator with weights [1 −2 1] will be more sensitive to image noise than a first derivative operator with weights [−1 1]. Moreover, coring on second derivative responses can introduce DC and low-pass artifacts.

On the other hand, the choice of where to core depends also on the nature of the signal. For example, the need to recover bar-like rather than edge-like structure could make the second derivative response a more suitable coring input. In fact, there is very little perceptible difference between the performance of these two coring alternatives.

The traditional coring threshold function is $C_0(j) = m_0 r$ if $|r| > b_0$ and $C_0 = 0$ otherwise; where r is the filter output, $b_0$ is a threshold parameter, and $m_0$ is a peaking parameter with value greater than 1, sometimes used to enhance the high-pass information remaining after the threshold filter such as edges and is similar to the peaking function in a television display. Another known coring function which is smoother is $$C_i = r^{m_i}\{1 - \exp(-b_i|r|)^{h_i}\}$$

in which hi controls the abruptness of the transition from the cored to uncored region, bi controls the width of the coring region, and mi controls the amount of peaking. This smoother function tends to reduce the visibility of "popping" artifacts caused by an abrupt change in the amount of coring from one spatial position to the next.

An aspect of the invention is that the coring filters 58 have an adaptive threshold which varies from one position to the next in the images. At those positions at which the noise response is high, a higher coring threshold is used for more effective noise-cleaning. A coring filter with this adaptive property has a threshold:

$$C_i = m_i f_i(k)\{|f_i(k)|/[|f_i(k)| + |f_3(k)| + S]\}$$

where $f_i(k)$ is the response of filter di at spatio-temporal position k, $f_3(k)$ is the response of the temporal filter d3 at position k, S is a threshold parameter set to be non-zero to prevent division by zero, and $m_i$ is a parameter controlling peaking and the sharpness of the coring threshold, respectively. The pure temporal channel is preferably attenuated in the final reconstruction by setting $m_3$ for filter d3 close to zero to eliminate flicker caused by spatio-temporal noise.

The fact that the coring filters have an adaptive threshold property can be seen by considering the fractional term alone, i.e., $$F_i = \{[m_i|f_i(k)|]/[|f_i(k)| + S']\}$$

with $S' = |f_3(k)| + S$. It is a sigmoid non-linearity that asymptotes at $m_i$ and reaches its half maximum at $S' = |f_3(k)|$. Increasing the value of S', in this case by increasing the value of $|f_3(k)|$, thus has the desired effect of raising the threshold of the coring filter when the noise is large.

The saturation function $F_i$ can be expressed more generally as $$F_i = \{[m_i|f_i(k)|]/[S_{j=1}^n a_j|f_j(k)| + S]\}$$

The $f_i$ noise term has become a weighted sum of filter responses, allowing optimization to a better estimate of the noise. For example, the distribution of the pure noise response across the different spatio-temporal channels can provide a weighting scheme for the contribution of these channels to an estimate of the noise. However, in most circumstances the simple function $F_t$ performs well.

Figure 8:
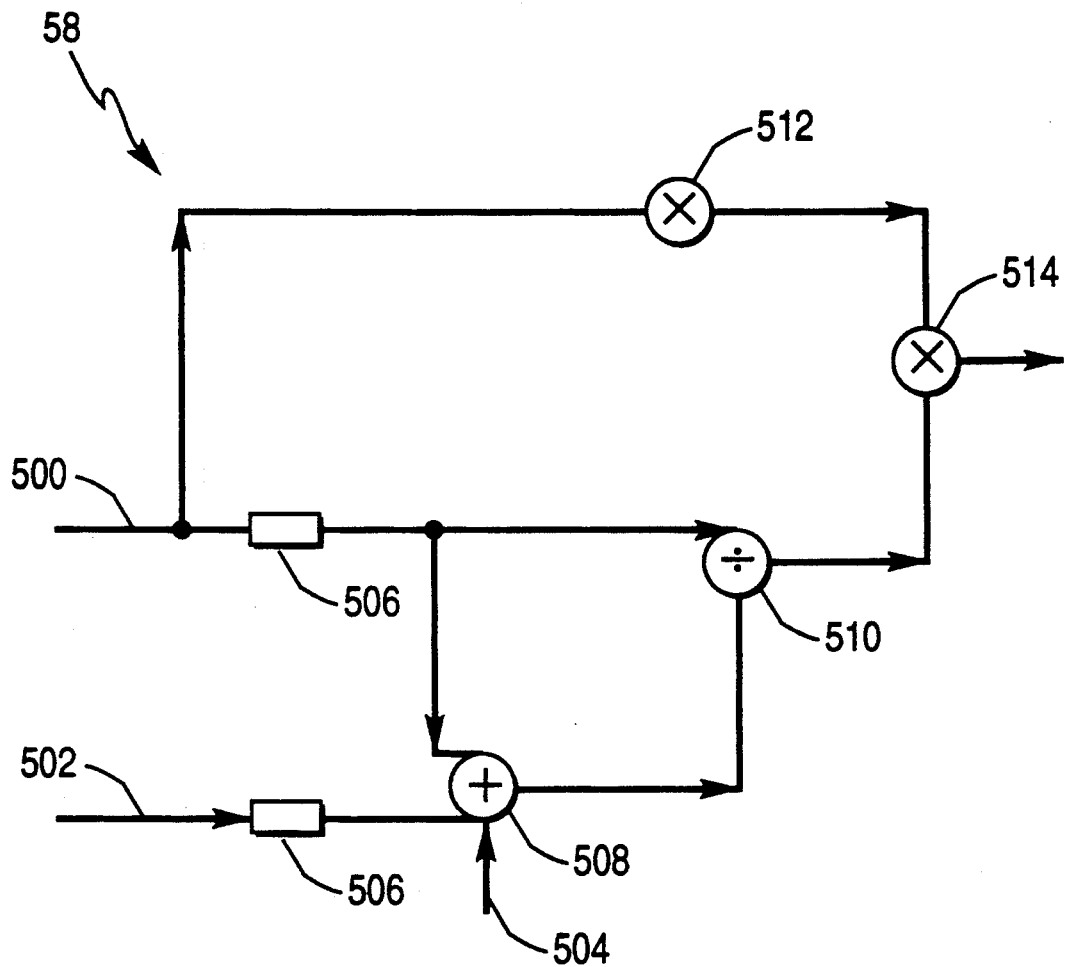
FIG. 8 is a block diagram of the coring filter of FIG. 2.

In FIG. 8, the coring filter 58 is shown in block diagram form. The coring filter 58 in the path of a particular oriented filter di includes input paths 500, 502 and 504. The input on path 500 is $f_i(k)$, the response of filter di at position k. The input on path 502 is $f_3(k)$, the response of the temporal filter d3 at position k. The input on path 502 is S, the threshold parameter. The input on path 502 passes through a device 506 having as its output the absolute magnitude of the device input to an adder 508. A portion of the input on path 500 passes through a device 506 to an input of the adder 508 and an input of the divider 510. Another portion of the input on path 500 passes through multiplier 512 to an input of divided 514. The input on path 504 is the threshold parameter S. The output of adder 508 is connected to a second input of divider 510. The output of divider 510 is connected to a second input of multiplier 514. The output of multiplier 514 is the cored signal.

Figure 9:
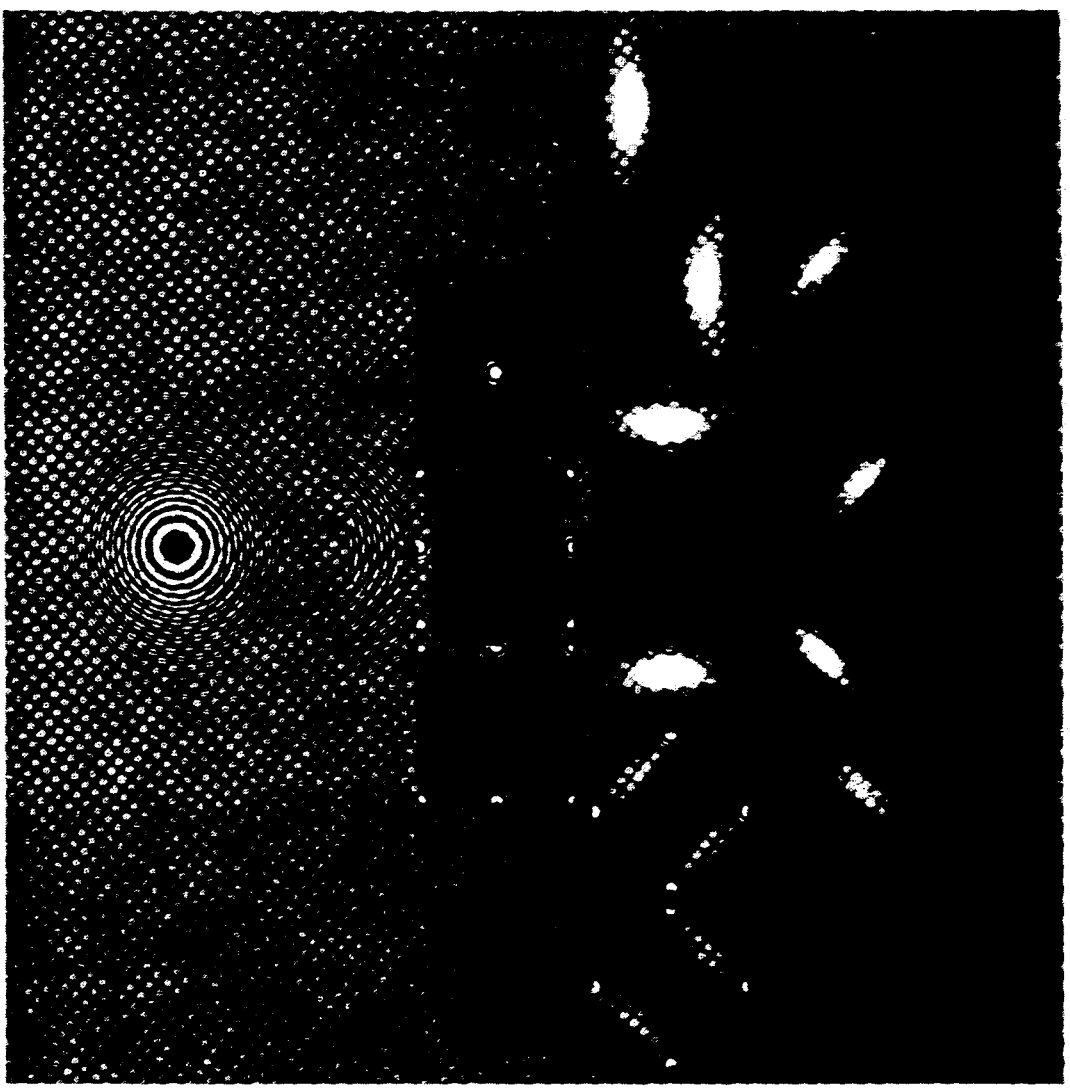
FIG. 9 is a photograph of the output of the different decomposition components of the of a moving plate.

In FIG. 9 the result of a spatio-temporal oriented decomposition on a moving zone plate test sequence is shown. The photograph is of the printout of the results of using a general purpose computer programmed to calculate the output of the decomposition filters of a sequence of images generated in the computer.

The sequence of images was generated using $$Z(r,t) = \cos\{2p(\phi t + wr^2)\}$$

where t is the frame number and r is the radius from the center point in each frame. The image at the top of FIG. 9 is one frame from the sequence, with an XT slice through the vertical mid-line shown directly below. The optic flow at each spatial point in the sequence is along a radius towards the center of the frame, with velocity increasing as the distance to the center decreases. Because the orientation, spatial frequency, and velocity vary systematically in this sequence, it is useful for visualizing the tuning of the thirteen decomposition filters. For example, among the three rows of filter responses, the first response in the second row shows selectively for a diagonal spatial orientation, but no selectivity for velocity, since it responds equally to opposite directions of motion. The first response on the third row shows selectivity for the same spatial orientation, but also for velocity; it is more sensitive to motion up and to the left than to motion in the opposite direction.

Other invertible spatio-temporal decompositions, such as 3-D generalizations of the QMF and related wavelet structures, could be used instead of the gradient decomposition. 2-D wavelet image representations, as disclosed for example by Rioul et al in an article entitled "Wavelets And Signal Processing" in the IEEE Signal Processing Magazine, October, 1991, pages 14–38, are oriented spatial functions, linear combinations of which can be used to define an image. In the case of a wavelet representation, there are at least two sets of wavelets for different orientation. Typically three sets of wavelet basis functions, a set of horizontally oriented functions, a set of vertically oriented functions, and a linear combination functions derived from wavelets having right and left diagonal orientation. Once the sets of oriented basis functions which define the source images are obtained, a set of oriented basis functions for the composite is selected in the same way as for the basis functions generated using the gradient operators and the composite image is then reconstructed from them. As stated above, a good decomposition for coring purposes is one in which the filters are well-matched to relevant signal features and poorly matched to the noise. Thus, the task of optimizing the decomposition using the filters depends to some extent on the specific signal domain in question.

The process of the invention is useful not only for noise cleaning but also more generally for the enhancement of selected signal components. So, for some problems involving moving images, a spatio-temporal coring process represents an alternative to the early computation of optic flow. In addition, flow can be computed directly from the cored spatio-temporal filter responses, allowing robust flow estimation in the presence of noise.

A spatio-temporal coring process and system has been disclosed. This process and system are based on a set of spatio-temporally oriented decomposition filters, and on an adaptive coring function that uses the response of neighboring filters to set the gain for each filter. Noise cleaning results for this 3-D coring process are better than those achieved by other coring processes on typical noisy image sequences.

It is to be understood that the apparatus and method of operation taught herein are illustrative of the invention. Modifications may readily be devised by those skilled in the art without departing from the spirit or scope of the invention. The method disclosed here makes use of many and orientations. Other directionally sensitive techniques for measuring features in an image can also be used in the method of the invention. The embodiments of the invention have been described in terms of different filters and other electronic components. Many, if not all, of the steps of the method can equally well be executed using a digital computer.

I claim:

1. A method for reducing the noise in a sequence of images comprising the steps of
   decomposing each image into low frequency band pass sub-image and a prefiltered sub-image;
   decomposing each prefiltered sub-image into a plurality of component patterns which are oriented in space, time and a combination of space and time;
   subjecting each component pattern to a coring means to form a plurality of filtered patterns; and
   reconstructing the image from the filtered patterns and the low frequency band pass sub-image.

2. The method of claim 1 wherein the step of decomposing each prefiltered sub-image comprises applying operators oriented in space and/or time to each picture element of each sub-image.

3. The method of claim 2 wherein each oriented component pattern is the gradient of the local image intensity at each picture element of each sub-image in a particular direction or in time.

4. The method of claim 2 wherein each operator oriented in space and/or time is applied twice to form the second derivative of the intensity each picture element of each sub-image.

5. The method of claim 2 wherein the step of subjecting each component pattern to a coring means comprises setting the output of the particular coring means to zero if the intensity of the component pattern is less than a threshold value or equal to the intensity of the component pattern if the intensity of the component pattern is greater than a threshold value.

6. The method of claim 2 wherein the step of subjecting each component pattern to a coring means comprises setting the output of the particular coring means to $$C_I = m_I f_I(k)\{|f_I(k)|/[|f_I(k)| + |f_3(k)| + S]\}$$

where $f_I(k)$ is the intensity of the component pattern at spatio-temporal position k in the sub-image I, $f_3(k)$ is the response of the temporal filter at position k, S is a threshold parameter set to be non-zero to prevent division by zero, and $m_I$ is a parameter controlling peaking and the sharpness of the coring threshold.

7. The method of claim 2 wherein each oriented component pattern is the gradient of the local image intensity at each picture element of each sub-image in a particular direction or in time.

8. The method of claim 7 wherein the step of subjecting each component pattern to a coring means comprises setting the output of the particular coring means to zero if the intensity of the component pattern is less than a threshold value or equal to the intensity of the component pattern if the intensity of the component pattern is greater than a threshold value.

9. The method of claim 7 wherein the step of subjecting each component pattern to a coring means comprises setting the output of the particular coring means to $$C_I = m_I f_I(k)\{|f_I(k)|/[|f_I(k)| + |f_3(k)| + S]\}$$

where $f_I(k)$ is the intensity of the component pattern at spatio-temporal position k in the sub-image I, $f_3(k)$ is the response of the temporal filter at position k, S is a threshold parameter set to be non-zero to prevent division by zero, and $m_I$ is a parameter controlling peaking and the sharpness of the coring threshold.

10. Apparatus for reducing the noise in a sequence of images comprising the steps of:
   means for decomposing each image into a low frequency band pass sub-image and a prefiltered sub-image;
   means for decomposing each prefiltered sub-image into a plurality of component patterns which are oriented in space, time or a combination of space and time;
   means for coring the component patterns to form a plurality of filtered patterns; and
   means for reconstructing the image from the filtered patterns and the low frequency band pass sub-image.

11. The apparatus of claim 10 wherein the means for decomposing each prefiltered sub-image comprises a plurality of filters oriented in space and/or time to each picture element of each sub-image.

12. The apparatus of claim 11 wherein output of each of the plurality of oriented filters is a gradient of the local image intensity at each picture element of each sub-image in a particular direction and/or time.

13. The apparatus of claim 12 further comprising a second plurality of oriented filters connected in series to the output of the first plurality.

14. The apparatus of claim 10 wherein the means for coring the component patterns comprises means for setting the output of the particular coring means to zero if the intensity of the input component pattern is less than a threshold value or equal to the intensity of the input component pattern if the intensity of the component pattern is greater than a threshold value.

15. The apparatus of claim 10 wherein the means for coring the component patterns comprises means for setting the output of the particular coring means to the value $C_I$ where $C_I$ is $$C_I = m_I f_I(k)\{|f_I(k)|/[|f_I(k)| + |f_3(k)| + S]\}$$

where $f_I(k)$ is the intensity of the component pattern at spatio-temporal position k in the sub-image I, $f_3(k)$ is the response of the temporal filter at position k, S is a threshold parameter set to be non-zero to prevent division by zero, and $m_I$ is a parameter controlling peaking and the sharpness of the coring threshold.

16. Apparatus for coring an n-dimensional signal, wherein n has a value of at least three and one of said n dimensions is time; said apparatus comprising:
   first filter means including respective first low-pass filters for each of said n dimensions of said signal;
   second filter means including respective second high-pass filters for each of said n dimensions of said signal;
   a first set of at least thirteen two-tap orientation filters, wherein a first subset of three of said thirteen filters of said first set compute the simple first derivatives of time and each of two given ones of said n dimensions other than time; wherein a second subset of six of said thirteen filters of each of said first and second sets compute the first derivatives of each of the two diagonals of time and a first of the two given ones of said n dimensions other than time, the first derivatives of each of the two diagonals of time and a second of the two given ones of said n dimensions other than time, and the first derivatives of each of the two diagonals of the two given ones of said n dimensions other than time with respect to one another; and wherein a third subset of four of said thirteen filters of each of said first and second sets compute the first derivatives of each of four different combinations of orientations of all of the three dimensions of time and both of the two given ones of said n dimensions other than time with respect to one another;
   a set of at least thirteen coring filters each of which corresponds to a separate one of the thirteen orientation filters of said first set of orientation filters; each coring filter its own predetermined coring transfer function;
   first coupling means for applying the outputs of said respective second low-pass filters of said second filter means to the appropriate ones of said thirteen orientation filters of said first set of said orientation filters;
   second coupling means for applying the output of each of said thirteen orientation filters of said first set of said orientation filters to the input of that coring filter of said set of coring filters which corresponds thereto;
   summation means; and
   fifth coupling means for applying the output of each of said first low-pass filters of said first filter means and the output of each of said thirteen coring stages to said summation means;
   whereby, in response to said n-dimensional signal being applied in parallel to the respective inputs of said first and second filter means, said summation means derives a signal-enhanced version of said n-dimensional signal.

17. The apparatus of claim 16 further comprising a second set of at least thirteen two-tap orientation filters identical to said first set, each filter of said second set connected in series to the same filter of the first set;

wherein second coupling means applies the output of each of said thirteen orientation filters of said second set of said orientation filters to the input of that coring filter of said set of coring filters which corresponds thereto.

* * * * *